Dec. 10, 1929.　　　B. P. GRAVES　　　1,738,647
MACHINE CLAMP
Filed March 31, 1926　　　3 Sheets-Sheet 1
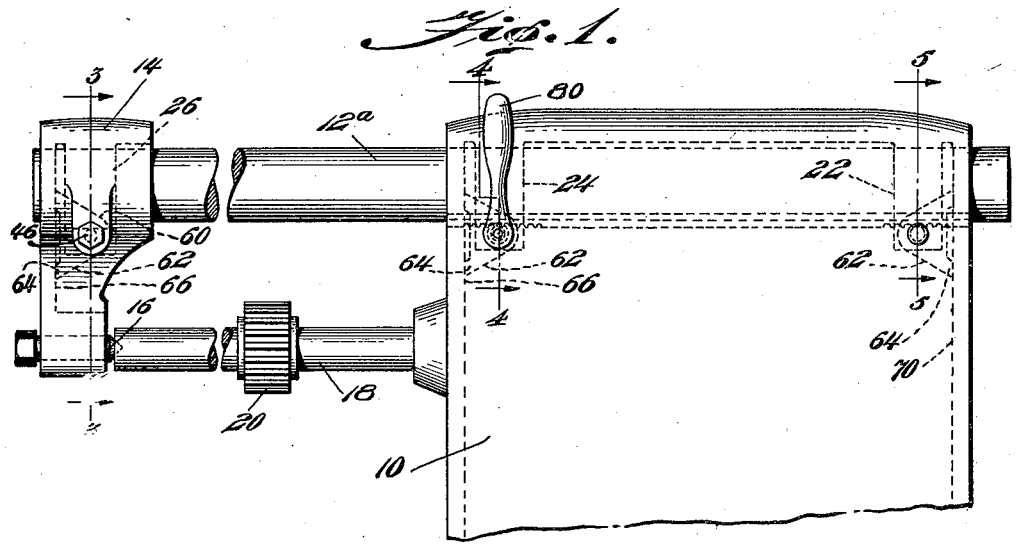
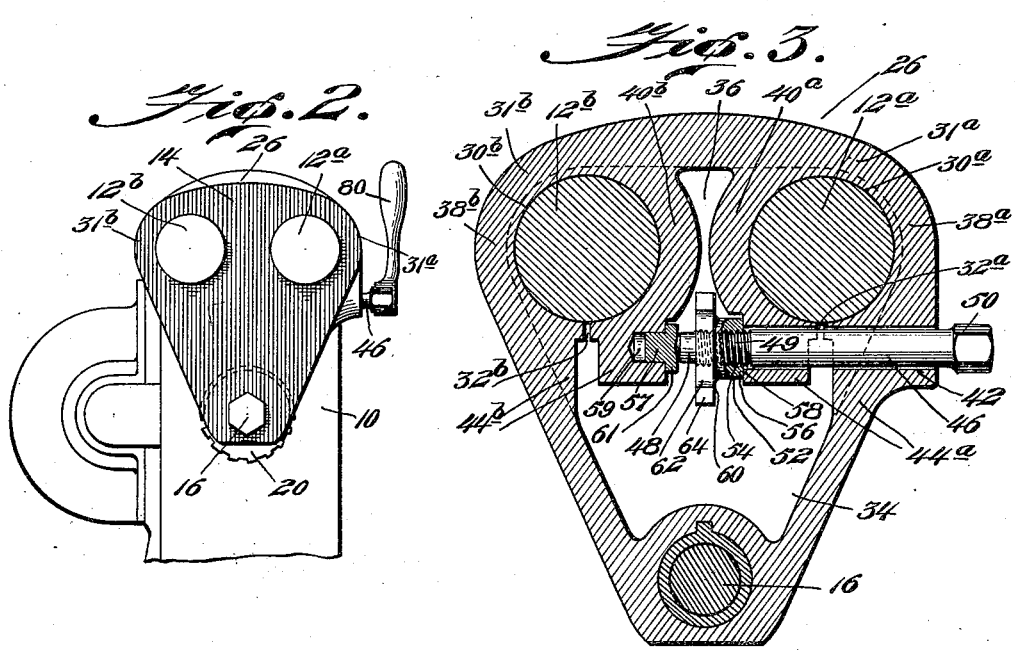
Inventor
Benjamin P. Graves
By Thomas A. Jenkins Jr.
Attorney

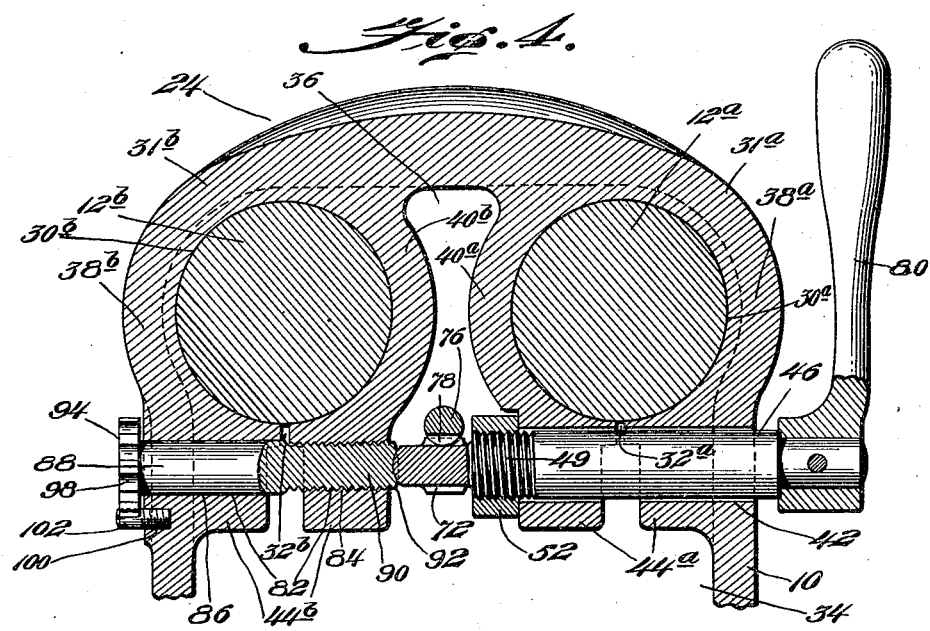
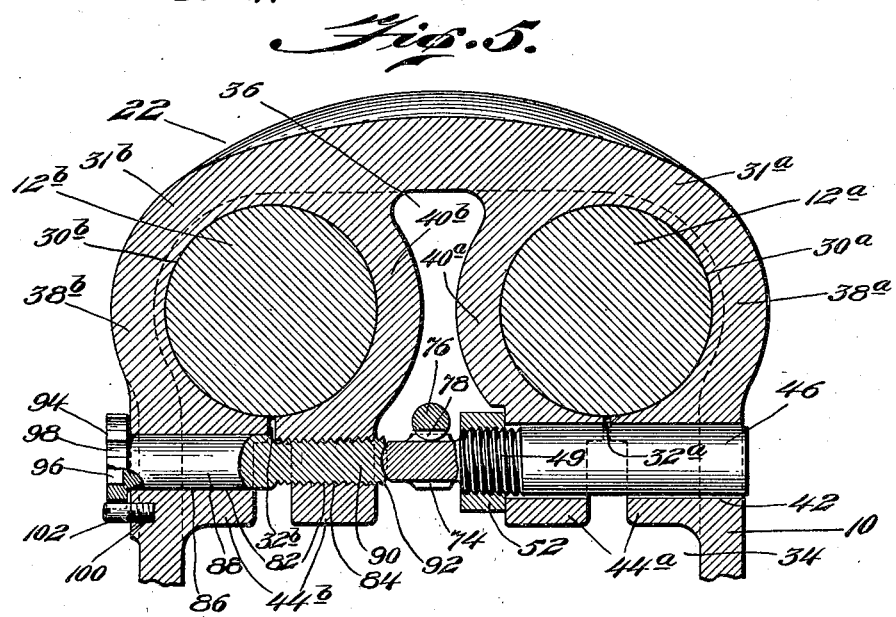

Dec. 10, 1929.   B. P. GRAVES   1,738,647
MACHINE CLAMP
Filed March 31, 1926   3 Sheets-Sheet 3

Inventor
Benjamin P. Graves
By Thomas A. Jenkes Jr.
Attorney

Patented Dec. 10, 1929

1,738,647

UNITED STATES PATENT OFFICE

BENJAMIN P. GRAVES, OF CRANSTON, RHODE ISLAND, ASSIGNOR TO BROWN AND SHARPE MANUFACTURING COMPANY, OF PROVIDENCE, RHODE ISLAND, A CORPORATION OF RHODE ISLAND

MACHINE CLAMP

Application filed March 31, 1926. Serial No. 98,765.

My invention relates to machines, particularly milling machines and includes a new type of split double clamping bearing for parallel arms.

I am aware that in milling machines, to provide two or more points of support for the arbor yoke, a plurality of overhanging arms have been mounted in the column thereof to form a supporting base line therefor. My invention relates to a milling machine provided with two or more overhanging arms and includes means whereby the overhanging arms may be adjustably clamped to the column and to the arbor yoke in a uniform plane thereby insuring that the overhanging arms will be parallel to each other throughout their length to form a perfect base line of a triangle to correspondingly evenly support the arbor yoke.

In milling machines it has been customary to provide a plurality of bearings, one relatively near the front end thereof, the other relatively near the back to support the overhanging arm in the column. My invention specifically provides means whereby two overhanging arms may be simultaneously clamped in a uniform plane in each set of bearings both front and back in the column. I also provide means for adjusting the clamping relation between said bearings and clamping device.

To these ends I specifically provide a new type of split double bearing having parallel bores therein for the overhanging arms to evenly and uniformly clamp simultaneously each overhanging arm. I employ in my preferred embodiment this general type of split double bearing in three places, namely at the front of the column, at the back of the column and in the arbor yoke.

These and such other objects of my invention as may hereinafter appear will be best understood from a description of embodiments thereof such as are shown in the accompanying drawings.

In the drawings, Fig. 1 is a side elevation of the column, overhanging arms, cutter arbor and cutter of a light duty milling machine.

Fig. 2 is a front elevation thereof.

Fig. 3 is a cross sectional view taken along the line 3—3 of Fig. 1.

Fig. 4 is a cross sectional view taken along the line 4—4 of Fig. 1.

Fig. 5 is a cross sectional view taken along the line 5—5 of Fig. 1.

Fig. 6 is a side elevation of a portion of a side of the column showing the means I employ to individually adjust the clamping action of each individual front and back split bearing of the column.

Figure 7:
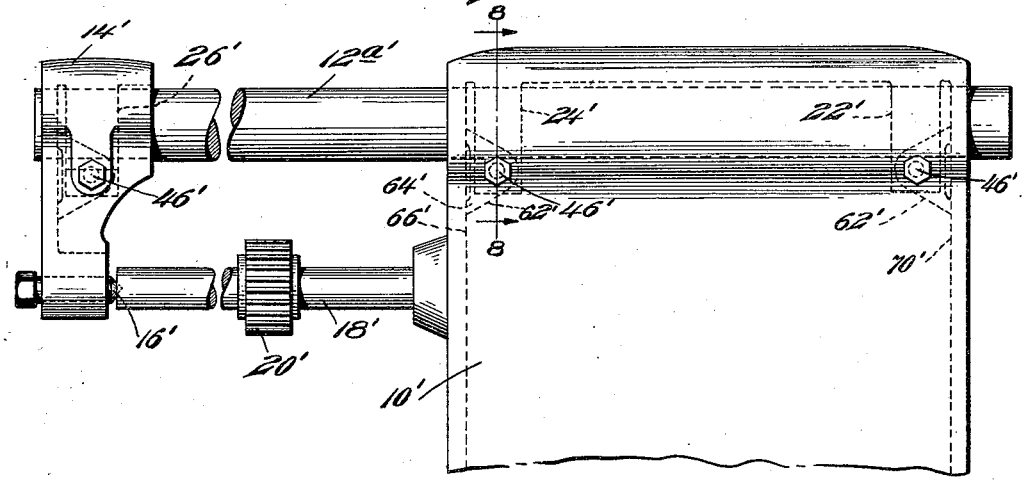
Fig. 7 is a side elevation similar to Fig. 1 of a heavy duty milling machine.

In the drawings, 10 generally represents the cutter arbor supporting column of a milling machine having a plurality of overhanging arms $12^a$ and $12^b$ adjustably mounted therein. The usual arbor yoke 14 is adjustably mounted on the front of said overhanging arms $12^a$ and $12^b$ and contains the usual centre 16 for mounting the cutter arbor 18 on which the usual cutting tool 20 is suitably mounted as usual, the opposite end of the cutter arbor 18 registering with the spindle in the column 10 as usual. The desirability of having a plurality of overhanging arms to provide a base line on which the arbor yoke may be more firmly secured has already been pointed out.

As also intimated, in my preferred embodiment, I preferably employ a new type of split double flexible bearing for supporting the two overhanging arms $12^a$ and $12^b$ and I use this general type of bearing at all the usual points of support of the overhanging arms, namely the flexible double bearing 22 for the overhanging arms at the back of the column, the flexible double bearing 24 for the overhanging arms at the front of the column and the flexible double bearing 26 for the arbor yoke 14. Figs. 3, 4 and 5 are cross sectional views of these split double bearings 26, 24 and 22 respectively, which as explained are generally similar in structure and function.

The type of split double bearing shown in Fig. 3, which as explained is the type used for both light and heavy duty machines on the arbor yoke 14, includes the two parallel bores 30ª and 30ᵇ for receiving the front ends of the overhanging arms 12ª and 12ᵇ. In my preferred embodiment, to provide a flexible bearing, the interior of the arbor yoke is centrally cored in a manner to be explained. Each of the walls of said parallel bores 30ª and 30ᵇ is provided with a preferably vertical split 32ª and 32ᵇ extending into the cored portion 34 underneath said bearings 31ª and 31ᵇ. The portion of the yoke 14 between said bearings 31ª and 31ᵇ is also preferably cored as at 36 to provide flexibility. It is thus obvious that the vertical splits 32ª and 32ᵇ extending into the cored portion 34 provide each bore 30ª and 30ᵇ with the relatively fixed outer sides 38ª and 38ᵇ comprising slightly more than half the periphery of said bores and provide the relatively flexible inner sides 40ª and 40ᵇ for each bearing, comprising slightly less than half the periphery of said bores separated by said splits 32ª and 32ᵇ from said relatively fixed sides 38ª and 38ᵇ. Said sides 40ª and 40ᵇ are rendered relatively flexible as they extend between the splits 32ª and 32ᵇ and the central cored portion 36 between said bores 30ª and 30ᵇ.

I provide clamping means connecting the flexible portions 40ª and 40ᵇ of said split double bearings to simultaneously draw said flexible portions of each bearing toward the other relatively fixed portions 38ª and 38ᵇ of each bearing to simultaneously clamp each bearing of a set to its respective overhanging arm. In the preferred embodiment shown in Fig. 3, said means is preferably constructed as follows. A bore 42 preferably of smaller diameter than said parallel bores 30ª and 30ᵇ is preferably provided in the base 44ª of one of said individual bearings, 31ª or 31ᵇ, in my preferred embodiment through the base 44ª of the individual bearing 31ª substantially at right angles to said parallel bores 30ª and 30ᵇ and through the vertical split 32ª in the bearing 31ª. The clamping bolt 46 is adapted to project through said bore 42. Said bolt 46 is provided with an inner end 48 adapted when in set position to extend through the cored portion 36 between said bearings 31ª and 31ᵇ to the inner side of the base 44ᵇ of the inner flexible side 40ᵇ of the bearing 31ᵇ. Said bolt is provided with a threaded portion 49 adjacent to the side of said cored portion 36 near the base 44ª and said bolt 46 is also provided with the bolt-head 50 exterior of said bearing 26 and arbor yoke 14. I provide a nut 52 to provide a base for relative movement of said bolt 46 having an internal thread 54 adapted to engage with the thread 49 on said bolt 46. The base 56 of said nut 52 is adapted to abut the inner side 58 of the base 44ª of the flexible inner side 40ª of the bearing 31ª. I also provide means to prevent said nut 52 from turning on turning movement of said bolt 46 so that said nut 52 may act as a base for said bolt 46. To accomplish this result in my preferred embodiment I preferably provide the head 60 of the nut with the transversely projecting fin 62 terminating in the flattened ends 64 adapted to register against the flat inner side 66 of the yoke 14 in front of the cored portions 34 and 36 of the bearings. (Fig. 1.) It is thus obvious that on relative turning movement of the bolt 46 the nut 52 will be unable to turn and that the bolt 46 will move inward to abut the inner side of the base 44ᵇ of the flexible inner side 40ᵇ of the bearing 31ᵇ to force it outward to firmly clamp the overhanging arm 12ᵇ in the bore 30ᵇ and that the base 56 of the nut 52 will abut the inner side of the base 44ª of the flexible side 40ª of the bearing 31ª and through the medium of the threaded connection 49—54 will draw the inner flexible side 40ª of the bearing 31ª outward to clamp the overhanging arm 12ª firmly within the bearing 31ª. It is thus obvious that as the bolt is turned that the flexible inner sides 40ª and 40ᵇ of said split flexible bearings 31ª and 31ᵇ will be simultaneously drawn outwards to simultaneously clamp both overhanging arms 12ª and 12ᵇ within the respective bearings 31ª and 31ᵇ as shown in Fig. 3. Although the end 48 of the bolt 46 may directly abut the inner side of base 44ᵇ of the flexible side 40ᵇ, the plug 57 may be seated in the bore 59 in said base 44ᵇ, the end 48 of the bolt 46 then abutting the base 61 of said plug.

Figure 8:
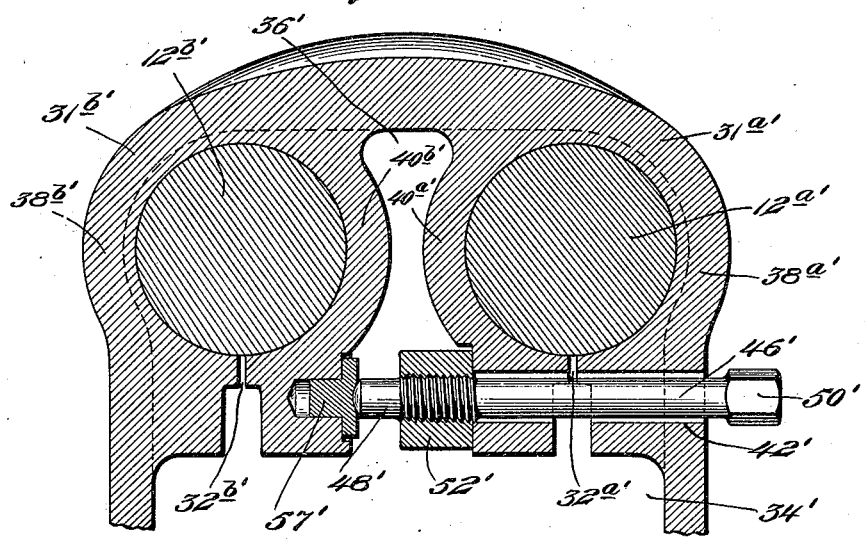
Fig. 8 is a cross sectional view taken along the line 8—8 of Fig. 7.

In Figs. 1–6 I show my invention applied to a light duty milling machine, whereas in Figs. 7 and 8 I show the preferred type of my invention employed on a heavy duty milling machine. In the heavy duty milling machine shown in Figs. 7 and 8 the flexible double bearings 22′ and 24′ for the front and back of the column respectively are identical in construction with the split double bearing 26 which has just been described for use on the arbor yoke 14 in either type. The column underneath the split double bearing, however, is normally hollow and the cored portion underneath the bearing normally includes the entire hollow body 34′ of the column. The split double bearing 24′ for the front of the column as shown in Fig. 7 and Fig. 8 in section is identical in construction to the split double bearing 26 hitherto described for use in the arbor yoke 14, the split double bearing 22′ for use on the back of the column is also identical in construction to the split double bearing 26 for use on the yoke 14, with the exception that the fin 62 projects in a rearward direction to abut the inner rear side 70′ of the back wall of the column.

In the preferred embodiment for use on a light duty milling machine as shown in Figs. 1–6, I provide in addition a manually operated device for simultaneously operating the clamping means of both sets of flexible bearings so that the overhanging arms 12ª and 12ᵇ may be simultaneously clamped in their flexible double bearings 24 and 22 located respectively at the front and back of the column.

In my preferred embodiment shown and as illustrated in detail in Figs. 4 and 5, Fig. 4 being a cross sectional view of the bearing 24 and Fig. 5 being a cross sectional view of the bearing 22, I provide in the bearing 24 the portion of the end of the bolt 46 located centrally of the cored portion 36 with the preferably integral gear 72 and I provide in similar position a gear 74 on the rear bearing 22 and I mount on said column 10 so as to have the teeth thereof register within the gear teeth of said respective gears 72 and 74, the transversely extending rack 76 provided with the aforesaid teeth 78 on the lower edge thereof. For ease of manipulation, I preferably provide the end of the bolt 46 of the front bearing 24 projecting exterior of the column 10 with the operating handle 80. It is thus obvious that as the operating handle 80 is turned forward that the inner respective flexible sides 40ª and 40ᵇ of the bearing 24 shown in Fig. 4 will be drawn outward to clamp the overhanging arms 12ª and 12ᵇ against the fixed sides 38ª and 38ᵇ of said bearing 24 and it is also obvious that as the bolt 46 is revolved forward it will tend to draw the rack 76 forward which in turn will tend to revolve the bolt 46 of the rear split bearing 22 to simultaneously draw the flexible sides 40ª and 40ᵇ of said bearing outward to clamp said overhanging arms 12ª and 12ᵇ firmly against the fixed sides 38ª and 38ᵇ thereof to firmly secure said arms at the rear of the column 10. It is thus obvious that I have provided a device which will simultaneously clamp the overhanging arms in each respective bearing 24 and 22 thereof at the front and rear thereof.

In the preferred embodiment shown in Figs. 4 and 5, I also provide means for adjusting the clamping relation between the clamping means for the front bearing 24 and the clamping means for the rear bearing 22. To accomplish this, in my preferred embodiment, I provide the additional bore 82 in the base 44ᵇ of the bearing 31ᵇ approximately in line with and parallel with the bore 42 in the base 44ª of the bearing 31ª. The inner end of said bore 82 up to the split 32ᵇ is preferably threaded as at 84 for a purpose to be described. The outer end 86 of the bore in the fixed side 38ᵇ is of slightly larger diameter. I insert the bolt 88 through the portion 86 of the bore and screw the inner threaded portion 90 thereof into the threaded portion 84 of said bore, the inner end 92 of said bolt thus projecting within the cored portion 36 between the bores of said individual bearings 31ª and 31ᵇ. The head 94 of said bolt is constructed as shown in detail in Fig. 6, the centre portion thereof being provided with the elongated slot 96 for receiving the end of a screw driver for turning purposes and its outer periphery is provided with semi-circular grooves 98 arranged at equidistant intervals thereon. A screw socket 100 is provided in the side of the column 10 adjacent to the outer periphery of the bolt head 94. It is thus obvious that the bolt head 94 may be turned to vary the projection of the inner end 92 within the cored portion 36 and that when set in desired position the head 94 of said bolt may be adjustably locked to said column 10 by inserting the screw 102 through the adjacent semi-circular groove 98 in the bolt head 94 and into the threaded socket 100. Although I have explained the details of this clamp adjusting device as applied to the rear bearing 22, as shown in Fig. 4 an identical construction is employed for adjusting the front bearing 24. It is thus obvious that I have provided means for adjusting the clamping relation between the front and back bearings of the column.

Though I have shown the split bearings 22, 24 and 26 provided with vertical splits, it is obvious that horizontal or angularly disposed splits may be employed provided however one portion of each bearing is relatively fixed and the opposite portion thereof relatively flexible, but that in order to employ the improved type of clamping means in Fig. 7, it is preferable that vertical splits be employed. It is also obvious that the outer portions 38ª and 38ᵇ of said bearings may be relatively flexible and the inner portions 40ª and 40ᵇ of said bearings relatively fixed without departing from the spirit of my invention.

As pointed out, my invention not only resides in the specific type of split double bearing shown and described for use with any type of a plurality of overhanging arms in any machine, but also comprises in a milling machine employing two overhanging arms for supporting the cutter arbor the combination of means to clamp a separate front column bearing for said arms and a separate rear column bearing for said arms in a uniform plane to keep said arms in parallel alignment throughout their length and also to clamp the arbor yoke to said overhanging arms in the same uniform plane to keep them in parallel alignment throughout their length so that they may form a more perfect base for mounting the cutter arbor thereon. The essential feature of my invention therefore is, that any type of flexible bearings preferably constructed as shown and described to prevent dust, dirt, etc., from entering into the splits thereof may be employed provided with any suitable type of clamping means if the clamping means thereof function in their clamping action in a uniform or a parallel plane.

It is understood that my invention is not limited to the specific embodiments shown and that various deviations may be made therefrom without departing from the spirit and scope of the appended claims.

What I claim as new and desire to secure by Letters Patent is:

1. In a milling machine, a column, two overhanging arms, parallel bearings for said arms extending transversely of said column in the same horizontal plane to form a base line for the cutter comprising, a front set of bearings each having a vertical split and an inner flexible portion separated by said split from the other outer portion and a similar back set, clamping means connecting said portions to simultaneously draw the inner flexible portion of each bearing of each set substantially equal amounts toward the other outer portion in a uniform plane to simultaneously clamp each bearing of a set to its respective overhanging arm, a manually operated device for simultaneously operating the clamping means of both sets of bearings, an arbor yoke adapted to support a cutter arbor detachably mounted on said arms containing parallel bearings for each arm extending transversely thereof in line with the bearings in the column each having a vertical split and an inner flexible portion separated by said split from the other outer portion thereof and clamping means connecting said portions to simultaneously draw the inner flexible portion of each bearing substantially equal amounts to its overhanging arm in a plane uniform with the plane of the clamping action of the column bearings.

2. In a milling machine, a column, two overhanging arms, bearings for said overhanging arms extending transversely of said column in the same horizontal plane to form a base line for the cutter comprising, a front set of bearings each having a split and a flexible portion separated by said split from the other portion and a similar back set, clamping means connecting said portions to simultaneously draw the flexible portion of each bearing of each set substantially equal amounts toward the other portion in a uniform plane to simultaneously clamp each bearing of a set to its respective overhanging arm, an arbor yoke adapted to support a cutter arbor detachably mounted on said arms containing bearings for each arm extending transversely thereof in line with the bearings in the column each having a split and a flexible portion separated by said split from the other portion thereof and clamping means connecting said portions to simultaneously draw the flexible portion of each bearing substantially equal amounts toward the other portion to simultaneously clamp each bearing to its overhanging arm in a plane uniform with the plane of the clamping action of the column bearings.

3. In a milling machine, a column, two overhanging arms, bearings for said overhanging arms extending transversely of said column in the same horizontal plane to form a base line for the cutter comprising, a front set of bearings each having a split and a flexible portion separated by said split from the other portion and a similar back set, clamping means connecting said portions to simultaneously draw the flexible portion of each bearing of each set substantially equal amounts toward the other portion in a uniform plane to simultaneously clamp each bearing of a set to its respective overhanging arm, a manually operated device for simultaneously operating the clamping means of both sets of bearings and means for adjusting the clamping relation between said clamping means.

4. In a machine having two parallel adjustable arms, the combination of a double bearing for said arms comprising two flexible bearings having parallel bores each having a vertical split near the base thereof, a relatively fixed outer side, and a relatively flexible inner side separated by said split from said relatively fixed side, said bearings being separated from each other by an open portion to render the inner sides of said bearings flexible, a bore extending through the base of one of said bearings substantially at right angles to said parallel bores, a clamping bolt projecting through said bore having an inner end extending through said open portion to abut the inner end of the flexible side of said opposite bearing and having a threaded portion adjacent the opposite side of said open portion and a bolt head projecting exterior of said bearing, a nut threaded on said threaded portion of said bolt containing bearing having its base abutting the inner side of the inner flexible side of said bolt containing bearing and means to prevent said nut from turning on turning of said bolt.

In testimony whereof I affix my signature.

BENJAMIN P. GRAVES.